United States Patent
Sun et al.

(10) Patent No.: US 7,472,911 B2
(45) Date of Patent: Jan. 6, 2009

(54) GASKET FOR PIPE COUPLING AND PIPE COUPLING INCORPORATING SAME

(75) Inventors: Jianyong Sun, Macungie, PA (US); Lawrence W. Thau, Jr., Flemington, NJ (US)

(73) Assignee: Victaulic Company, Easton, PA (US)

( * ) Notice: Subject to any disclaimer, the term of this patent is extended or adjusted under 35 U.S.C. 154(b) by 191 days.

(21) Appl. No.: 10/554,679

(22) PCT Filed: Apr. 23, 2004

(86) PCT No.: PCT/US2004/013689

§ 371 (c)(1),
(2), (4) Date: Oct. 25, 2005

(87) PCT Pub. No.: WO2004/097270

PCT Pub. Date: Nov. 11, 2004

(65) Prior Publication Data

US 2007/0040336 A1     Feb. 22, 2007

Related U.S. Application Data

(60) Provisional application No. 60/465,686, filed on Apr. 25, 2003.

(51) Int. Cl.
*F16L 17/06* (2006.01)
(52) U.S. Cl. .................. 277/608; 277/626; 285/110
(58) Field of Classification Search ............... 277/608, 277/616, 626; 285/112, 110, 39, 365, 373, 285/409
See application file for complete search history.

(56) References Cited

U.S. PATENT DOCUMENTS

| 1,541,601 A | 6/1925 | Tribe |
| 1,683,076 A | 9/1928 | Johnson et al. |
| 1,701,326 A | 2/1929 | Johnson |
| 1,704,003 A | 3/1929 | Johnson |

(Continued)

OTHER PUBLICATIONS

International Preliminary Report on Patentability mailed Dec. 8, 2005, with Transmittal PCT/IPEA/416, PCT/US04/013689.
International Search Report mailed May 16, 2005, PCT/US04/013689.

*Primary Examiner*—William L. Miller
(74) *Attorney, Agent, or Firm*—Abelman, Frayne & Schwab

(57) ABSTRACT

The present invention relates to leak preventing gaskets contemplated for use with segmented pipe couplings, which include a pair of coupling segments adapted to receive a gasket which surrounds a pair of pipe ends to join pipes together or to join a nipple or fitting. The couplings contemplated for use with the gasket of the invention includes types adapted to attach grooved and flare end pipes, or non-grooved pipes in sealed relation to withstand fluids at temperatures up to 230° F. and higher, and at pressures of up to 1,000 psi. The ring-type gasket of the present invention is made of an elastomeric material such as synthetic or natural rubber or combinations thereof, preferably, ethylene polypropylene diene monomer, commonly referred to as "EPDM". The gasket provides improved sealing through a pair of sealing flanges having relative planar and expansive inner walls, shorter sealing lips, and particular dimensional relationships with the grooved pipe ends. The invention also relates to a coupling incorporating such gaskets, as well as a method of providing a sealed coupling.

32 Claims, 9 Drawing Sheets

U.S. PATENT DOCUMENTS

| | | | |
|---|---|---|---|
| 1,808,262 A | 6/1931 | Hele-Shaw | |
| 1,867,891 A | 7/1932 | Reynolds | |
| 1,899,695 A | 2/1933 | Johnson | |
| 1,931,922 A | 10/1933 | Damsel et al. | |
| 1,967,466 A | 7/1934 | Damsel et al. | |
| 2,013,267 A | 9/1935 | Damsel | |
| 2,014,313 A | 9/1935 | Damsel | |
| 2,041,132 A | 5/1936 | Johnson | |
| 2,218,835 A | 10/1940 | Ulrich | |
| 2,692,155 A | 10/1954 | Gheen et al. | |
| 2,766,518 A | 10/1956 | Costanzo | |
| 3,113,791 A | 12/1963 | Frost et al. | |
| 3,134,612 A | 5/1964 | Glasgow | |
| 3,291,506 A | 12/1966 | Blakeley | |
| 3,351,352 A | 11/1967 | Blakeley et al. | |
| 3,430,989 A | 3/1969 | Wendt | |
| 3,680,894 A | 8/1972 | Young | |
| 3,761,114 A | 9/1973 | Blakeley | |
| 3,877,733 A | 4/1975 | Straub | |
| 4,487,421 A | 12/1984 | Housas et al. | |
| 4,522,434 A | 6/1985 | Webb | |
| 4,561,678 A | 12/1985 | Kunsman | |
| 4,601,495 A | 7/1986 | Webb | |
| 4,627,645 A | 12/1986 | Sauer | |
| 4,639,020 A | 1/1987 | Rung et al. | |
| 4,643,461 A | 2/1987 | Thau, Jr. et al. | |
| 4,664,422 A | 5/1987 | Straub | |
| 4,678,208 A | 7/1987 | DeRaymond | |
| 4,702,499 A | 10/1987 | DeRaymond et al. | |
| 4,702,500 A | 10/1987 | Thau, Jr. et al. | |
| 4,726,611 A | 2/1988 | Sauer | |
| 4,893,843 A | 1/1990 | DeRaymond | |
| 5,018,548 A | 5/1991 | McLennan | |
| 5,056,833 A | 10/1991 | Webb et al. | |
| 5,058,906 A | 10/1991 | Ademek et al. | |
| 5,094,492 A | 3/1992 | Levivier | |
| 5,203,594 A | 4/1993 | Straub | |
| 5,273,322 A | 12/1993 | Straub | |
| 5,603,508 A | 2/1997 | Dole et al. | |
| 5,758,907 A | 6/1998 | Dole et al. | |
| 6,170,884 B1 | 1/2001 | McLennan et al. | |

FLANGE SEALING SURFACE WITH LUBRICANT GROOVE

FLANGE SEALING SURFACE WITHOUT LUBRICANT GROOVE

GASKET FOR PIPE COUPLING AND PIPE COUPLING INCORPORATING SAME

CROSS-REFERENCE TO RELATED APPLICATIONS

This application is related to co-pending U.S. provisional application No. 60/465,686, filed Apr. 25, 2003, the disclosure of which is incorporated herein by reference in its entirety.

BACKGROUND OF THE INVENTION

1. Field of the Invention

The present invention relates to sealing gaskets for mechanical pipe couplings of the type which generally utilize a pair of coupling segments having mated bolt pads in which the gasket is seated and engages the spaced apart juxtaposed ends of a pair of pipes intended to be joined by the mechanical coupling. Mechanical pipe couplings take numerous forms including either grooved end pipes or smooth end pipes which may or may not be flared. The couplings are exemplary and the present invention is contemplated for use wherever gaskets are useful.

2. Description of the Related Art

Pipe couplings incorporating an elastomeric gasket for use in creating and forming a sealed joint between various types of pipes, whether metal or non-metallic, generally include multi-part coupling segments or pipes and fittings or valves, often a pair of coupling segments including mated bolt pads. The segments are bolted together and in the process of joining the coupling parts, the act of closure assists in seating the gasket firmly against the pipe ends. When the coupling segments are brought into juxtaposition for purposes of securement, often radially inward, peripheral and circumferential compressive forces are applied to the gasket. As a consequence the respective sealing surfaces between the gasket and the coupling segments and between the gasket and the pipe ends are intended to engage in face-to-face relation with the objective of creating a fluid tight seal.

Many of these mechanical joining applications are used in pipe systems carrying liquids at temperatures up to about 230° F. and higher, and pressures up to approximately 1000 psi. As well couplings of this type are used with fluids of all types, including toxic and volatile chemicals.

In the past it generally has been believed that gaskets intended for use with multi-part couplings and grooved pipe ends will perform more efficiently if there is a greater amount of elastomeric material present to fill the space between the coupling segments and the pipe. However, although counter-intuitive as taught herein, too great an amount of elastomeric material has been found to reduce the effectiveness of the seal between the surfaces of the gasket and the respective coupling segments and pipe surfaces. For example, in grooved pipe connections the gasket prior to its emplacement, although of one piece, has traditionally included sections of differing shapes including an annular ring shaped base which seats into the coupling segment, a pair of downwardly extending legs which nest along the inner sidewalls of the coupling and a pair of relatively wide inwardly extending lips which extend essentially to the ends of the two pipes being coupled. Generally, the upper surface of each lip was connected to the inner wall of the leg portions to form an arcuate surface with each leg. This thickened portion of the lip was considered to be highly desirable. In these prior art devices, when the coupling segments are brought together the distance between the leg and lip is reduced and the leg and lip joining area is reduced in size.

With such arrangements it has often been found that under extremely high temperatures the elastomeric material tends to swell or bulge along its inner curved surfaces and become fused. Generally elastomeric materials used with gaskets include natural and synthetic rubbers and combinations thereof and expansion of the elastomer generally exceeds expansion of the pipe by a significant factor often up to 15-20 times. In particular, with elastomeric materials such as ethylene polypropylene diene monomer (i.e. "EPDM") fusion of the various components of the gasket under high temperatures is common, and with the result that certain critical sealing areas are left without an effective amount of sealing material.

Moreover, even in the absence of temperatures and pressures sufficient to fuse the gasket material, the distal portions of the inwardly extending lips have been found to exert relatively low pressure against the pipe surface, and often lift upwardly and become fused to the downwardly bulging leg and inner lip portion. In this condition the sealing pressures also often become significantly reduced.

Examples of these and like prior art include commonly assigned U.S. Pat. No. 1,704,003 to Johnson which relates to a pipe joint which incorporates a gasket in the form of a unitary flexible sealing ring spanning the gap between pipes intended for connection. As well, commonly assigned U.S. Pat. No. 1,808,262 to Hele-Shaw discloses a pipe joint comprising a ring of flexible material having inturned flanges adapted to embrace the pipe ends.

U.S. Pat. No. 1,867,891 to Reynolds discloses a pipe joint utilizing elastic material to contain fluid under pressure and the type of prior art sealing gaskets suggested as being appropriate to systems of this type.

Although numerous prior patents have suggested modifications to the shape of the gasket including those used for high pressure services, all have generally included a leg and lip connection area intended for close juxtaposition upon loading of the gasket and/or relatively long inwardly extending lips.

Commonly assigned U.S. Pat. No. 1,899,695 to Johnson discloses a pipe joint sealing ring of flexible material having an opening which when in position in the joint is open to fluid pressure from the pipes so as to be sealed thereby; U.S. Pat. No. 1,931,922 to Damsel, et al. discloses a laminated article in the form of a packing ring which is formed of resilient material and which is coated with a non-corrosive and non-porous plastic material; U.S. Pat. No. 1,967,466 to Damsel discloses a ring for a pipe coupling having an annular cavity in its body;

U.S. Pat. No. 2,013,267 to Damsel discloses a pipe joint in which a channel-shaped packing gasket includes a split, imperforate reinforcing and protecting ring arranged in the gasket at the bottom of a channel and has sufficient rigidity to prevent the gasket from collapsing inwardly.

Commonly assigned U.S. Pat. No. 2,766,518 to Costanzo discloses a method for joining together sections of plastic pipe which includes a gasket of the internal pressure responsive type.

Commonly assigned U.S. Pat. No. 3,080,894 to Young discloses joints between pipes of different diameter and couplings and gaskets for same.

Commonly assigned U.S. Pat. No. 4,561,678 to Kunsman discloses a pipe coupling having a gasket receiving channel for reception of a double-lipped sealing gasket. The lips of the sealing gasket extend almost to the respective ends of a pair of grooved pipes intended for joinder by the coupling.

Commonly assigned U.S. Pat. No. 4,893,843 to DeRaymond discloses a lubricant-free elastomeric gasket which is structured so as to be positioned over an intended pipe without frictional engagement with the pipe.

Other art relating to pipe couplings of various types includes commonly assigned U.S. Pat. No. 4,702,499 to DeRaymond, et al. which relates to hingeable segmented pipe couplings.

Commonly assigned U.S. Pat. No. 5,758,907 to Dole, et al. relates to a pipe coupling having mis-adjustment limiting segments with stop members at their respective ends which prevent misalignment of the coupling segments during their assembly onto the adjacent ends of pipes for fittings. This coupling includes a sealing gasket which is placed in sealing engagement with adjacent ends of the pipes to be joined.

The present invention is directed to gaskets which provide substantially improved seals between the respective sealing surfaces and the coupling components and pipes while avoiding the use of excessive elastomeric material which interferes with the desirable operation of other portions of the gasket when under the influence of compressive forces. By providing supportive gasket sealing lips which resist upward curvature, and flanges which substantially retain their basic configuration under load, and by configuring the gasket to more closely seat between the pipe ends and the assembled coupling, improved sealing can be accomplished, and fusing or other undesirable interaction will be reduced or eliminated.

Although the gaskets disclosed are illustrated as being used with pipe couplings which are adapted to join grooved pipes, the gaskets are also applicable for use in mechanical pipe couplings generally, including non-grooved pipe ends.

BRIEF DESCRIPTION OF THE DRAWINGS

Preferred embodiments of the invention are described with reference to the drawings, wherein.

DETAILED DESCRIPTION OF THE PREFERRED EMBODIMENTS

Figure 1:
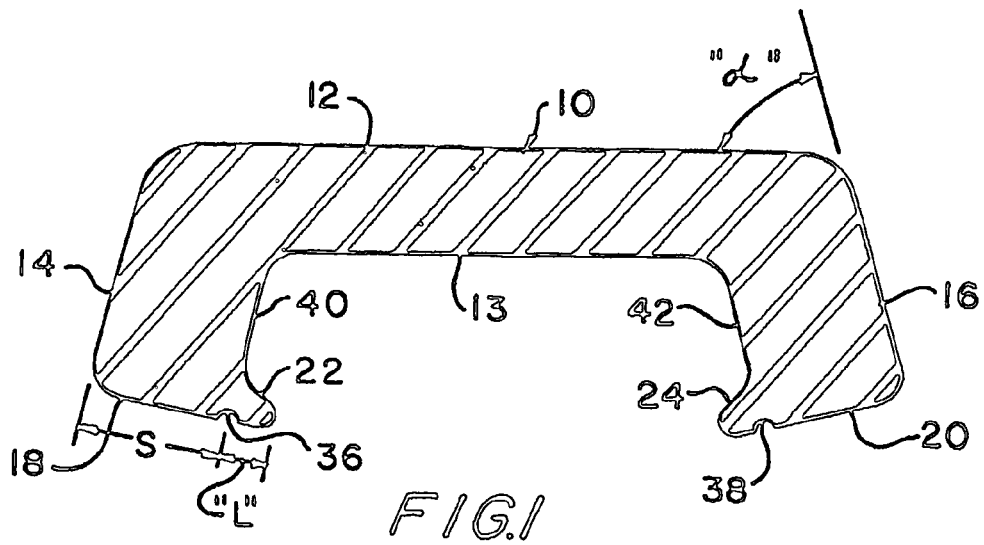
FIG. 1 is a cross-sectional view of a gasket made according to one embodiment of the present invention, shown in a relaxed condition, and incorporating a peripheral lubricant retaining groove extending circumferentially adjacent a portion of the lip of the gasket.

Referring to the drawings and in particular to FIGS. 1, 1C, 1D and 3, there is shown a gasket 10 for couplings in accordance with the present invention. While various types of elastomeric materials are contemplated for the gasket, one particular material which has been found desirable is ethylene polypropylene diene monomer, commonly referred to as "EPDM". As noted however, the present invention contemplates use of other synthetic material or natural rubber materials and combinations thereof.

In the past improved sealing was considered to be best accomplished by providing for increased use of elastomeric material. However, the present invention is directed to gaskets which reduce the amount of elastomeric material in certain areas in a manner which permits a more effective distribution of mechanical compressive sealing forces and enhances the stability of the gasket when subjected to increased heat and pressure, thereby promoting better and more uniform contact with the appropriate surfaces. Further, the gasket avoids excessive expansion and "bunching" of the elastomeric material within the coupling under substantial pressures and temperatures, and promotes more uniformity in the numerous gaskets that generally are found in piping systems.

Referring now to FIGS. 1, 1C, 1D and 3, the gasket 10 has been found to provide superior leak resistant sealing surfaces. The gasket 10 includes a flexible ring, in which a circular ring-like base member 12 has a pair of inwardly extending flanges 14, 16 formed integrally therewith as shown, with each flange extending inwardly in the radial direction and oriented generally outwardly at an acute angle to the ring-like base member 12 prior to installation into a mechanical pipe coupling, each flange having a radially innermost sealing surface 18, 20, each of which includes an axially inwardly facing lip 22, 24 when installed in a coupling, each lip forming an acute angle with the base member 12 when the gasket is uncompressed. As can be seen in the drawings the flanges 14, 16 are formed integrally with the ring-like base member 12.

Figure 2:
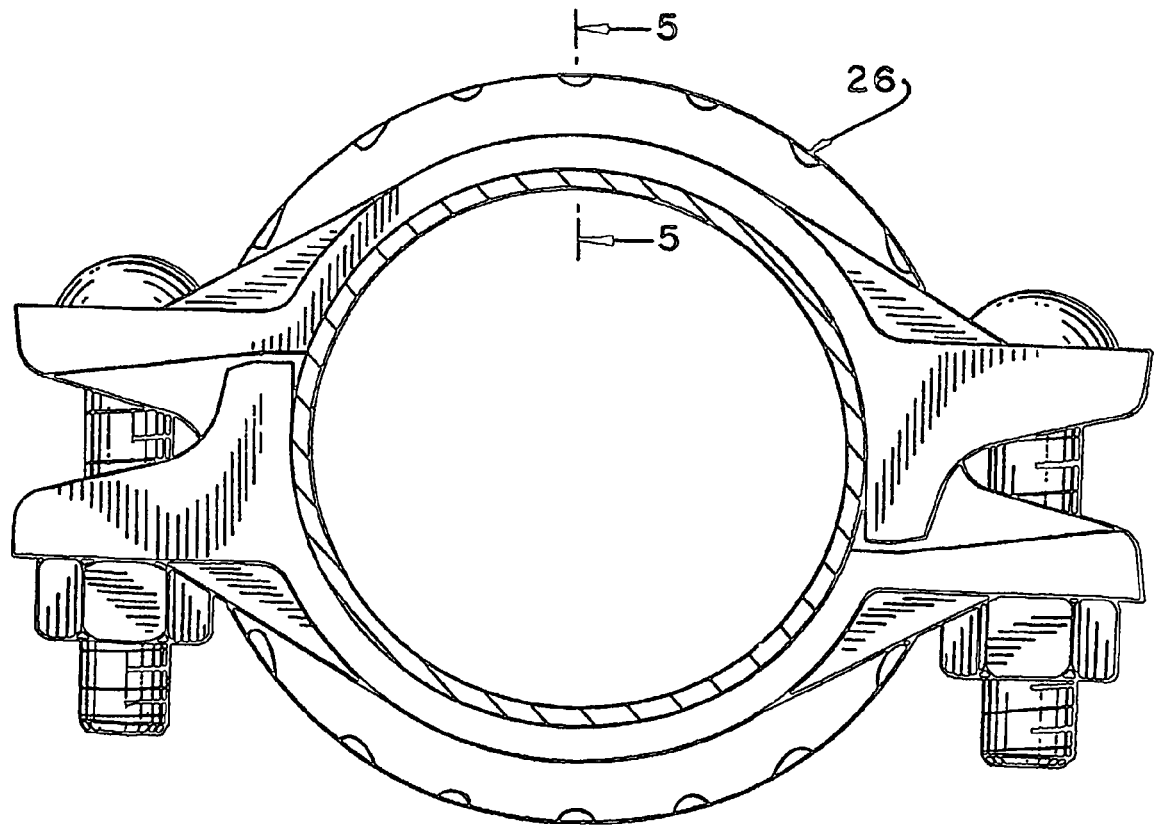
FIG. 2 is a front elevational view of a pipe coupling incorporating a gasket of the type shown in FIG. 1, assembled to retain a pair of grooved pipe sections having slidably engageable angled bolt pads showing the present gasket in a compressed condition.
Figure 5:
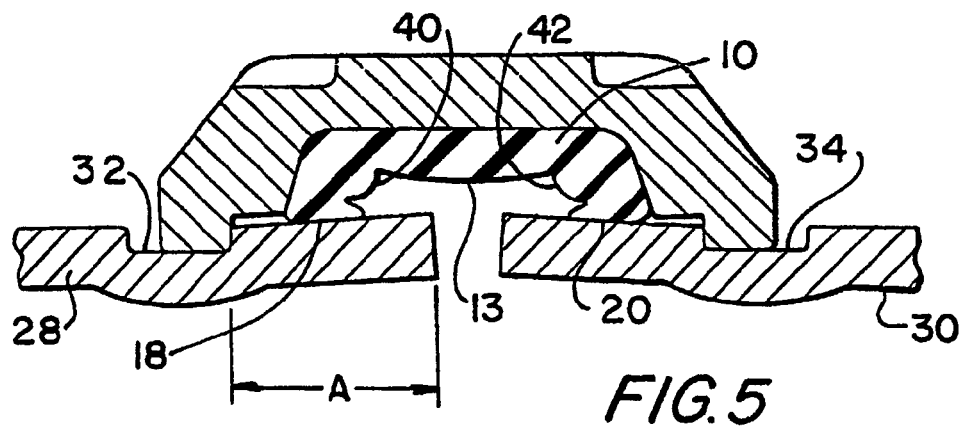
FIG. 5 is a cross-sectional view taken along lines 5-5 of the pipe coupling of FIG. 2 showing the gasket of FIG. 1 in a compressed condition.

Referring now to FIG. 2 and FIG. 5, a fully assembled coupling 26 is shown which connects pipe ends 28, 30 having peripheral grooves 32, 34 in a known manner. The coupling segments capture and retain the gasket 10 in FIG. 1. In FIG. 5, the gasket 10 is shown when subjected to the compressive forces created when the coupling segments are joined.

As best shown in FIG. 1 in its uncompressed state, lips 22, 24 of gasket 10 have a length "L" shorter than conventional gaskets. It has been found that rather than lessening the effectiveness of the lips, decreasing their length provides increased pressure responsiveness of lips 22, 24 against the pipe surfaces, with a resultant improvement of the seal.

As well, flanges 14, 16 of the gasket 10 have a configuration which promote and generate sealing pressure against the pipe surface, providing structural rigidity for the gasket between the coupling housing and the pipe surface. In addition to the fluid pressure within the coupling, a flange configuration such as those as shown in the drawings has been found to advantageously transmit forces to the lip to enhance sealing pressure. Whereas as in general prior gaskets were configured to include relatively loosely connected peripheral legs which were virtually hinged to the ring-like base member by an arcuate inner wall of each leg, the present invention provides a thickened wall cross-section on the flange and a zone of open area with arcuate connecting surfaces between the inner surface—or backwall—of the base member of the gasket and the upper inner area of the flange member. It has been found that through this modification in shape and dimension the sealing pressure distribution between the gasket and the pipe surface is enhanced.

Figure 16:
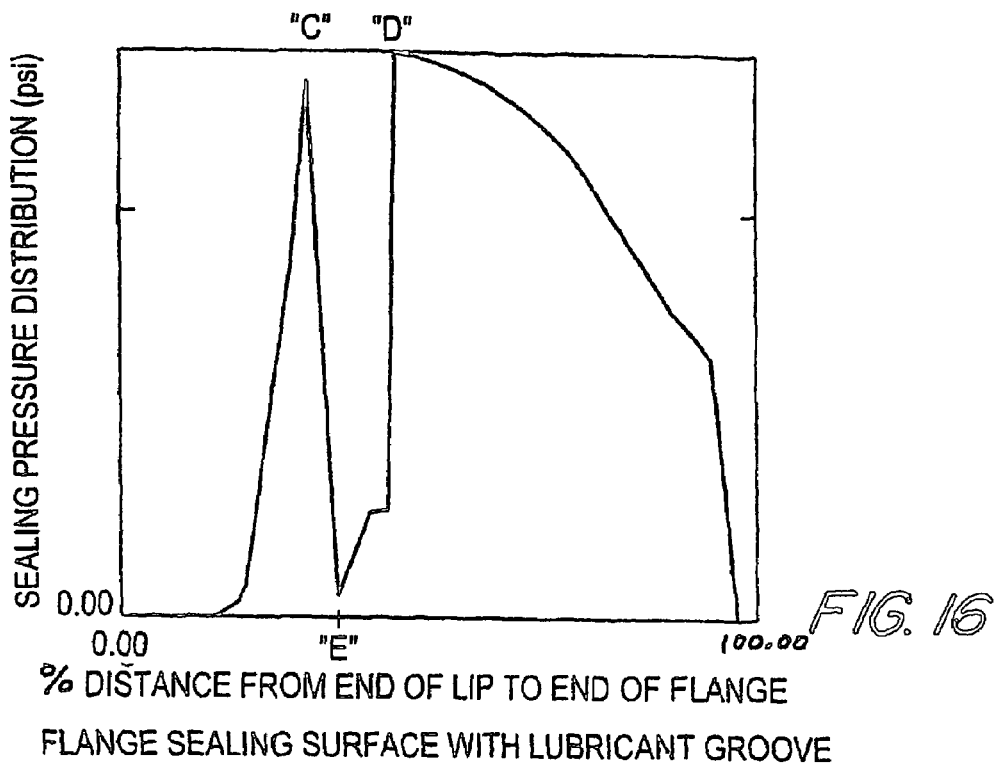
FIG. 16 is a graph illustrating the theoretical sealing pressure distribution of the flange sealing surface between the tip of the lip of the inventive gasket of FIG. 1C and the corner (i.e., the heel) of the supportive flange, the flange sealing surface including a lubricant retaining groove between points "C" and "D" of FIG. 1C as shown on the graph, with no lubricant applied.
Figure 17:
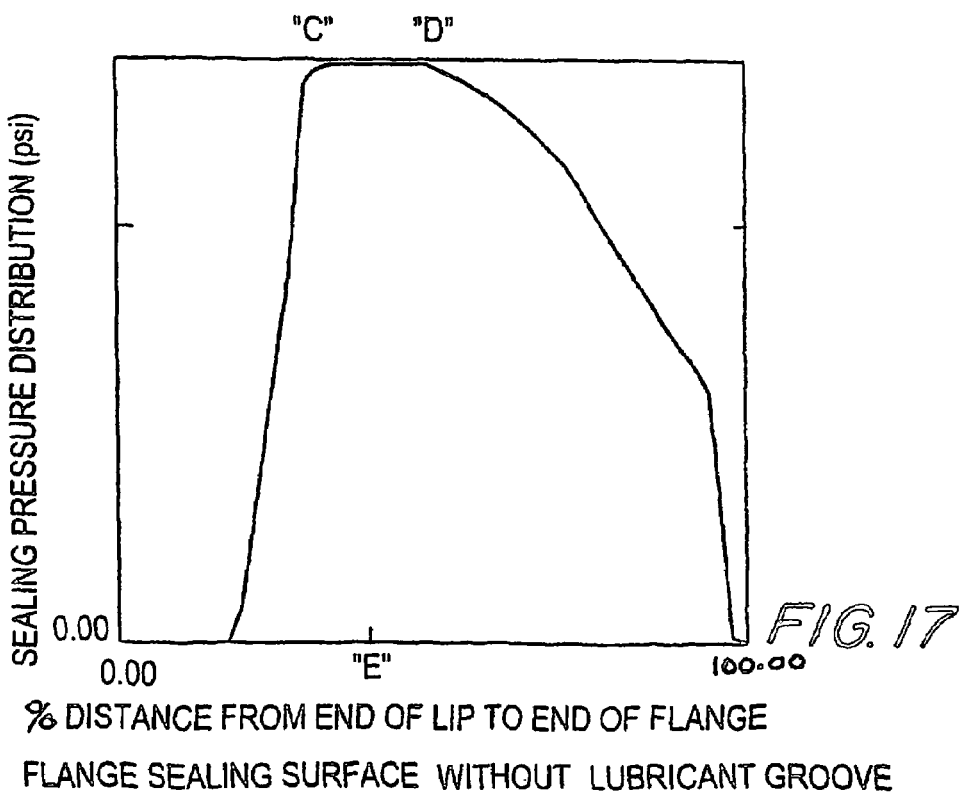
FIG. 17 is a graph illustrating the theoretical sealing pressure distribution of the flange sealing surface between the tip of the lip of the inventive gasket of FIG. 6 and the corner of the supportive flange, the flange sealing surface not including a lubricant retaining groove between points "C" and "D" as shown on the graph and no lubricant applied to the gasket.

For example, in prior art gaskets, on the assumption that the full extent of lips functioned as a sealing surface, the dimension "W" (FIG. 1A) from the tip of the lip to where it joined the leg was such that the ratio of dimension "W" to dimension "A" (FIG. 5) was maintained at about 0.5 or greater. In the present invention, the ratio of the width "S" of the flange in FIG. 1C, and the dimension "A" is preferably maintained between about 0.30 and 0.40 and it is not only as or more effective in sealing, but is significantly less susceptible to upward curling of its distal end portions and failure. Indeed, it has been found that as part of the overall flange configuration the shorter lip increases the lip's functionality in the sealing process, as is evidenced in FIGS. 16 and 17, which show the sealing pressure increasing above zero under portions of the lip. In FIGS. 16-17, "E" denotes the location of the planar annular inner wall of the flange, i.e. wall 42 in FIG. 1C and wall 94 in FIG. 6.

Figure 15:
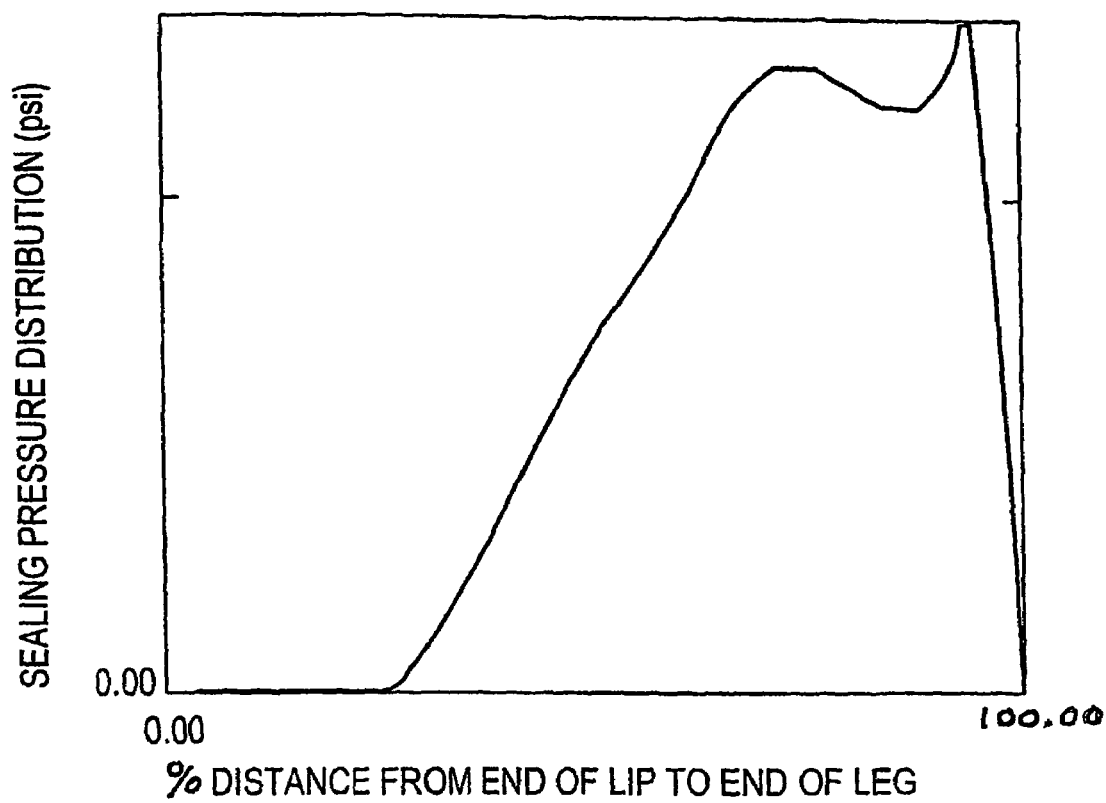
FIG. 15 is a graph illustrating the sealing pressure distribution of the sealing surface between the end of the lip of the prior art gasket of FIG. 1A and the corner of the leg.

A comparison of the prior art pressure distribution as shown in FIG. 15 with the pressure distribution of the present invention in FIGS. 16 and 17 illustrates the greater uniformity of the distribution pattern in FIGS. 16 and 17 as compared to the sudden rise to a peak in FIG. 15, followed by a sudden drop in pressure. Furthermore, as can be seen in FIGS. 15-17, to the extent that the lips were provided in prior gaskets, maximum sealing pressure was at or near the corner—or heel—of the leg, whereas the gaskets of the present invention place the maximum sealing pressure axially inwardly of the flange, or in the vicinity of the planar inner wall of the flange. This shifting of the location of maximum pressure has been found to enhance the sealing effectiveness of the combined flange and lip, thus preventing lifting of the lip and loss of the seal. Given the propensity of the distal end of the lip of prior gaskets to curl upward under heat and pressure, this repositioning of sealing forces is significant.

Figure 1A:
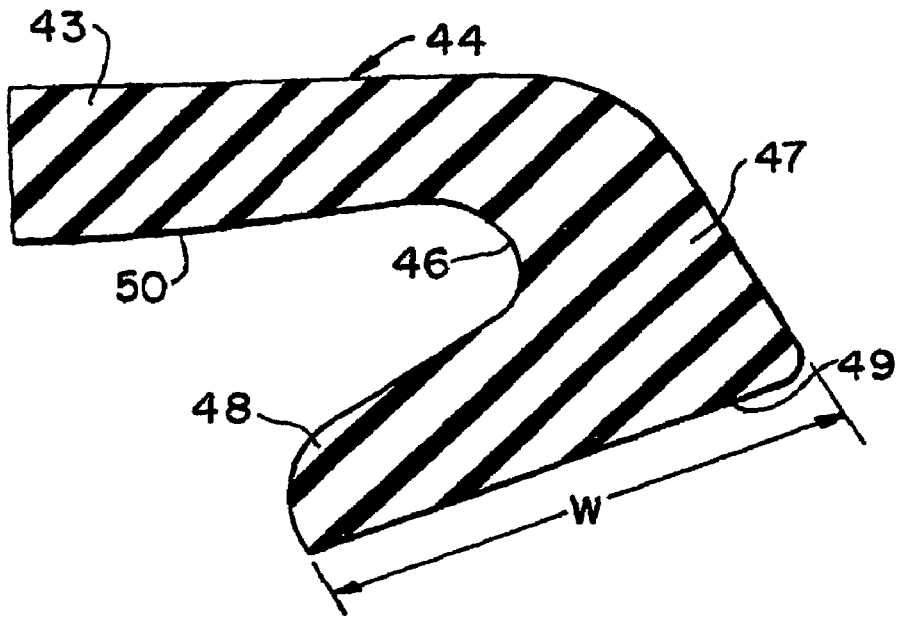
FIG. 1A is a cross-sectional view of a portion of a prior art gasket in the uncompressed condition, illustrating the arcuate inner wall surface connecting the leg of the gasket to the base.
Figure 1B:
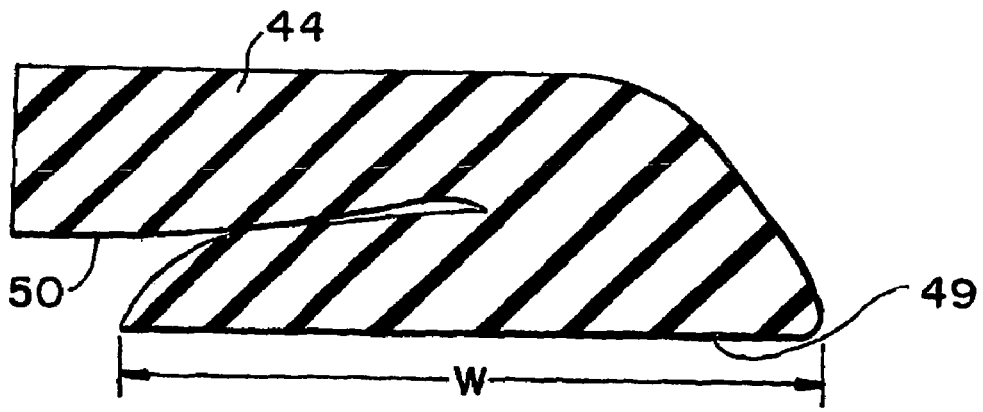
FIG. 1B is a cross-sectional view of the portion of the prior art gasket of FIG. 1A, illustrating the configuration of the gasket when compressed within a pipe coupling.
Figure 1C:
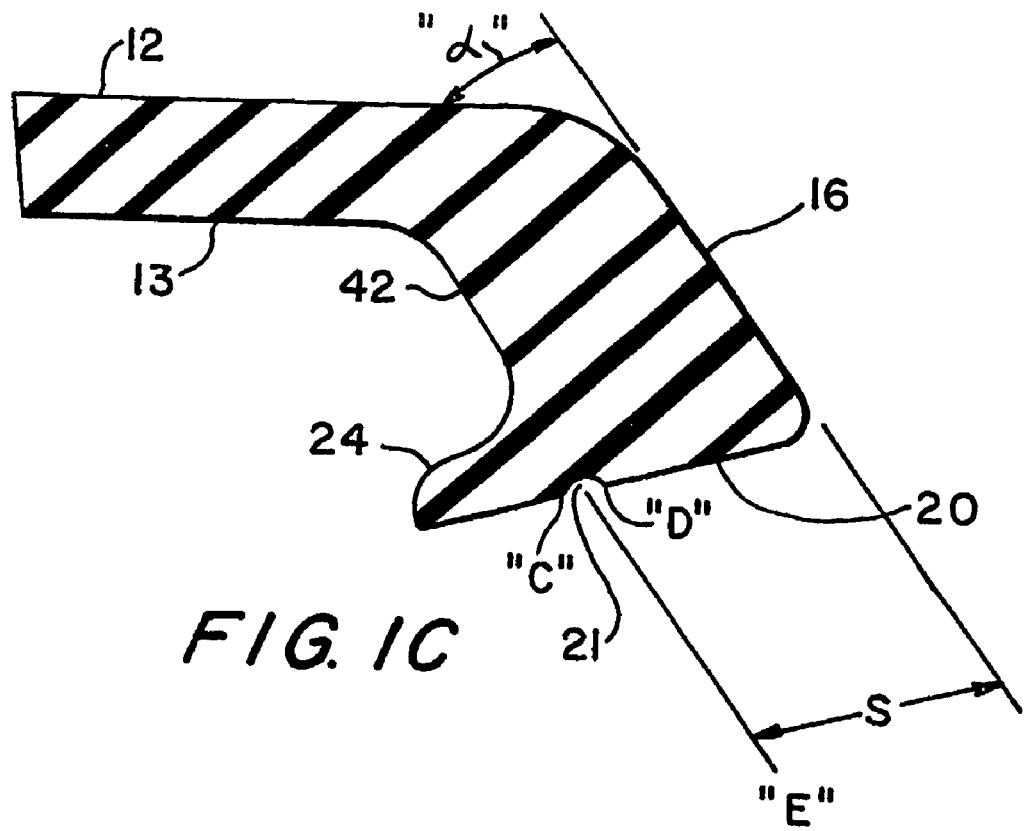
FIG. 1C is a cross-sectional view of a portion of a gasket constructed according to the present invention, in the uncompressed condition, illustrating an exemplary relatively substantial and supportive flange having a generally planar and extensive annular inner wall, a relatively short lip attached to the flange, and a lubricant retention groove adjacent the lip between points "C" and "D"
Figure 6:
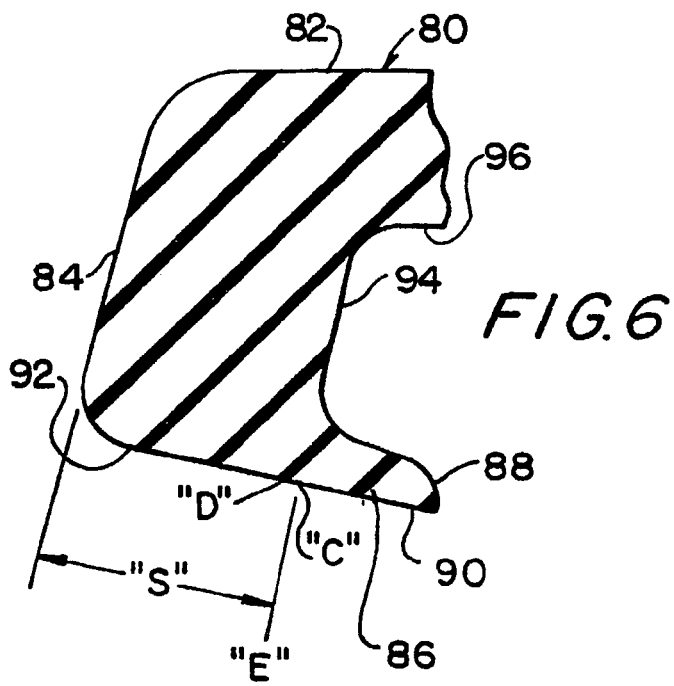
FIG. 6 is a cross-sectional view of a portion of a gasket constructed according to the present invention, incorporating an alternative sealing lip configuration.

The present invention also permits the use of a lubricant groove without meaningful loss of overall sealing pressure. Although lubricant grooves are considered desirable, an open channel on a sealing surface has tended to reduce sealing efficiency. However with the flanges having a lubricant groove as shown in FIGS. 1 and 1C, the planar inner wall of the flange is located directly above the lubricant groove. For flanges having no lubricant grooves as shown in FIG. 6, the maximum pressure is generated at or near the vicinity of the planar inner wall of the flange as shown at point "E" in FIG. 17. In such instance, the reduction in sealing pressure shown in FIG. 16 which is caused by the groove will not exist, and the pressure will be at a maximum between imaginary "groove" points "C" and "D", shown in FIG. 6 for illustrative purposes only, and as shown in FIG. 17.

Figure 1D:
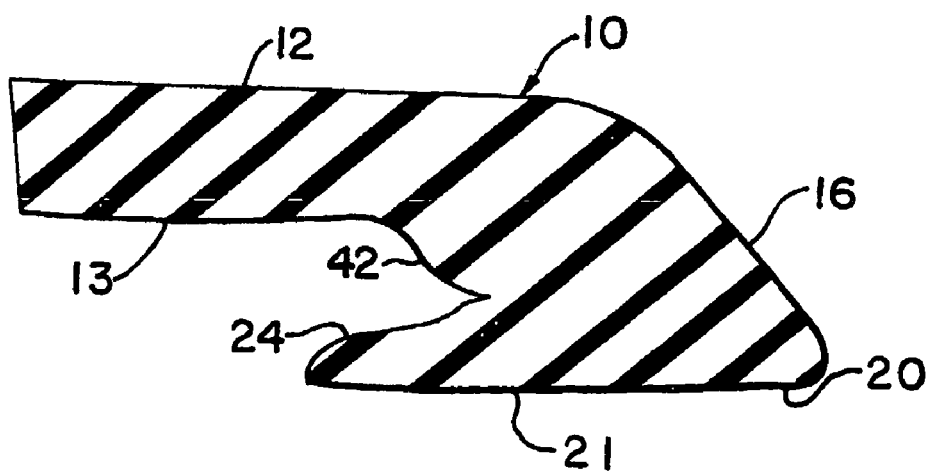
FIG. 1D is a cross-sectional view of the portion of the gasket of FIG. 1C, illustrating the configuration which the gasket assumes when positioned within a pipe coupling.
Figure 3:
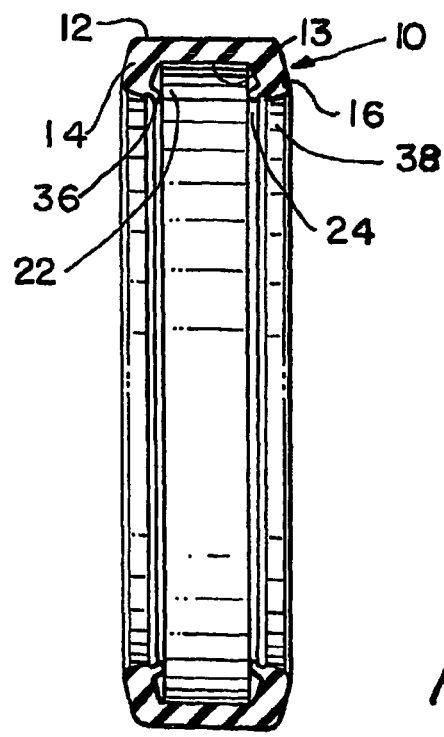
FIG. 3 is a cross-sectional view of the entire gasket of FIG. 1.

In addition, by configuring the inner annular peripheral inner surfaces 40, 42 of flanges 14, 16 as shown in FIGS. 1 and 1C, i.e. as planar surfaces at an acute angle to the peripheral ring-like base member 12, it will be appreciated that upon mechanical compression of gasket 10 within a coupling as shown in FIGS. 1D and 5, the inner peripheral surfaces 40, 42 assume an arcuate, or slightly "bulged" generally conical configuration (i.e., convex and inward). As shown in FIG. 1D this provides pressure responsiveness and improved supportive sealing forces in a direction toward the surfaces of the pipe ends. Although the annular peripheral surfaces 40, 42 of FIGS. 1 and 1C are only slightly bulged inwardly, nevertheless it can be seen that they retain their planar or near-planar shape thereby enhancing the sealing pressure responsiveness of the lowermost surfaces of the flanges 14, 16 and lips 22, 24.

Correspondingly, the radially outward sealing forces against the coupling halves are also improved. By minimizing the lengths of lips 22, 24, and by maximizing the planar and relatively expansive inner flange walls 40, 42, the tendency for the flanges to collapse and the lips to become fused under high temperatures to the inner peripheral surfaces 13, 40 and 42 is eliminated, even when subjected to water pressures in the range of 1000 psi and temperatures in the range of 230° F. and higher, notwithstanding the expansion factor of the elastomer which can be 15-20 times the expansion of the metal coupling components.

The flange configuration has been found to provide particularly advantageous results for high pressure, high temperature applications. For example, in prior art gaskets 44 such as shown in FIG. 1A, the inner wall surface 46 is arcuate in shape, and the dimension "W" extends from the heel of the leg 47 to the tip of the lip 48. The ratio of dimension "W" to dimension "A" is about 0.5 to about 0.9, where "A" is the distance from the pipe groove to the end of the pipe as shown in FIG. 5.

In a preferred embodiment of the present invention, as shown in FIGS. 1C and 1D, the ratio of the flange width "S" of the flange 16 to the dimension "A" shown in FIG. 5 is about 0.25 to about 0.45, and preferably from about 0.30 to about 0.40. A broader range of about 0.20 to about 0.50 is also foreseeable. The inner wall 42 of the flange of the inventive gasket shown in FIG. 1C is planar and has been increased in size to increase the pressure activated sealing of the connection as shown in FIG. 1D, when the flange is compressed within the coupling and subjected to high temperature fluid. FIG. 1B shows the prior art gasket of FIG. 1A wherein relatively long lip 48 touches backwall 50 when the gasket is compressed within a coupling, thereby providing the potential for the fusion of the lip to the backwall 50 under high temperatures. This is believed to be partly due to the lack of structural support provided by arcuate inner wall 46 which, under compression forces, acts as a hinge between lip 48 and ring-like base member 43, rather than as a support for the gasket components. Although leg 47 (only one shown) and sealing surface 49 (only one shown), based upon conventional design as shown in FIG. 1A, are intended to provide sealing against the pipe surfaces, as illustrated in FIG. 15, the sealing pressures are not effective over the entire surfaces, and this is believed to be due substantially to the absence of structural support by arcuate inner leg wall 46.

As noted in FIGS. 1 and 1C, the gasket flanges of the present invention in their uncompressed state are preferably at an angle "α" of about 60-85 degrees relative to the upper wall 12 and thus unlikely to act as a relatively weak hinge as in the prior art.

Referring now to FIGS. 1, 1C, 1D and 5, each sealing surface 18, 20 of the gasket of the embodiment shown includes a peripheral groove 36, 38 directly beneath the inner generally conically shaped walls 40, 42. It has been found that gaskets are more easily seated if their sealing surfaces have a suitable liquid lubricant over the entire gasket. Preferably the lubricant is one having a vegetable base such as the gasket lubricant marketed by Victaulic Company of America under the trademark Victaulic® brand coupling lubricant, commonly referred to as "VIC-LUBE" brand lubricant. By providing peripheral grooves 36, 38, the lubricant tends to fill the grooves and upon application of compressive forces by the coupling segments upon closure thereof, the grooves 36, 38 tend to trap the lubricant and gradually release it to the surrounding surfaces on both sides of the groove, thereby promoting smooth and uniform seating of the gasket sealing surfaces and avoiding pinching of the gasket surface between the pipe and the coupling housing as the coupling tightening process progresses. This in turn reduces undesirable gasket extrusion.

Upon completion of the coupling segment joining process, the grooves 36, 38 become substantially flattened and virtually eliminated, as shown in the cross-sectional view in FIG. 5. However, as noted, because of the initial presence of the lubricant on the surfaces 18, 20 and in grooves 30, 38, followed by a gradual release thereof during the tightening procedure, lubrication of the critical sealing areas surrounding the grooves and extending over the entire sealing surface is achieved.

Figure 4:
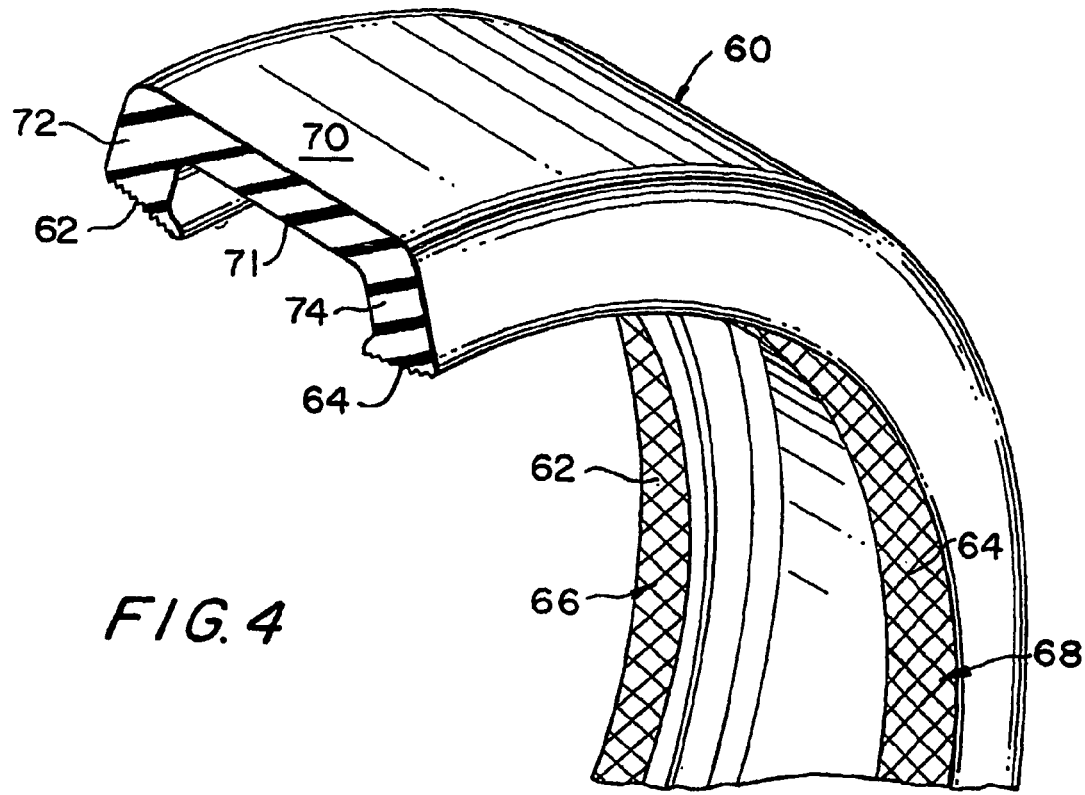
FIG. 4 is a right side perspective and cross-sectional view of a portion of a gasket of the type shown in FIGS. 1 and 3,
with an additional feature in the form of a knurled or cross-cut sealing surface incorporated thereon.

Referring now to FIG. 4, there is shown a portion of an alternative embodiment of the invention. Gasket 60 is configured similarly to gasket 10 of FIGS. 1, 1C and 3, with the addition of surface treatment in the form of knurling 62, 64 provided on sealing surfaces 66, 68. Although any type of surface roughening treatment is contemplated, one preferred form is as shown, i.e., in the form of a plurality of almost microscopic grooves oriented and extending in a crisscross or cross-hatched pattern. Although the grooves are less deep than the grooves 36, 38 of FIGS. 1 and 3, the pattern is capable of trapping lubricating oil and the areas affected by the distribution of lubricant oil during the coupling tightening process is more easily distributed along a wider area. In all other respects, the embodiment of FIG. 4 is the same as the embodiment of FIGS. 1 and 3 in that an elastomeric ring-like base member 70 is provided with inwardly extending flange members 72, 74 as shown. The knurling 62, 64 on sealing surfaces 66, 68 also assist in compensating for small surface imperfections on the pipes.

Referring to FIG. 6, there is shown a portion of another alternative embodiment 80 of the gasket of the present invention, wherein an elastomeric ring-like base member 82 is provided having a radially inwardly extending flange members 84 (only one is shown). In this embodiment, inwardly extending lips 86 (only one shown) are configured to have tip ends which are formed by the intersection of an arcuate surface 88 with flat sealing surface 90 to promote contact between the sealing surface 92 and the lip 86 with the surface of the pipe end.

The lip 86 will remain in full contact with the pipe surface, assisted by the water pressure acting downwardly on the upper surface 88, and will resist contact with inwardly bulging annular inner flange wall 94 should that occur and inwardly bulging backwall 96 should that occur, thereby avoiding fusion between the inner surfaces at elevated temperatures of up to about 230° F. and higher. Due to the shorter lips 88, and the substantially elongated and planar flange inner wall 94, there is less elastomeric material to be contacted as the backwall 96 bulges inwardly at under compression and at elevated temperatures. Moreover, the planar inner wall surface 94 and the relatively substantial flange 84 provides structural support for the gasket and promotes uniform sealing pressures against the pipe surface under pressure, while planar inner annular wall surface retains its generally planar or near planar shape. In some instances, the inner annular wall will bulge slightly inwardly, but will nevertheless retain its generally near planar shape.

Figure 7:
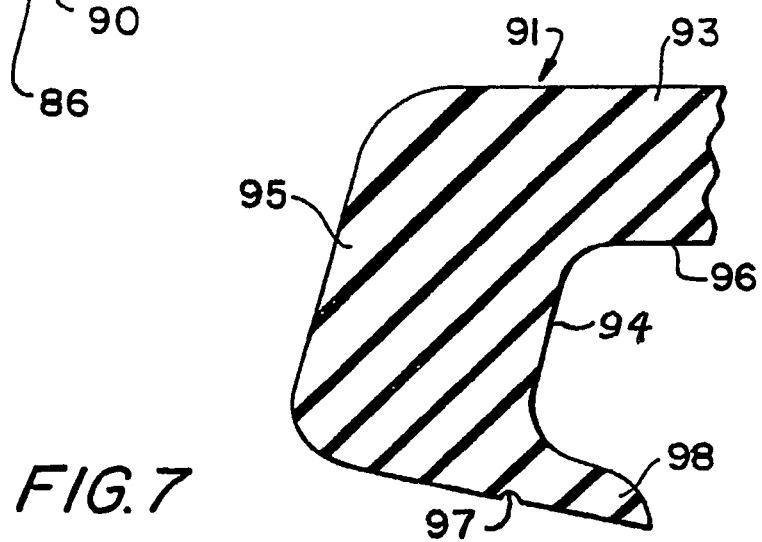
FIG. 7 is a cross-sectional view of a portion of an alternative embodiment of the gasket of FIG. 6, incorporating a peripheral lubricant retaining groove extending circumferentially adjacent a portion of the lip sealing surfaces.

Referring now to FIG. 7, a portion of still another alternative embodiment 91 of the gasket of the present invention is shown, wherein an elastomeric ring-like base member 93 has radially inwardly extending flange member 95 formed monolithically therewith as in the previous embodiments. The axially extending lips (only lip 98 shown) are configured substantially as shown in FIG. 6, but with the additional provision of lubricating oil trapping grooves (only groove 97 is shown)

which traps and gradually releases the lubricant upon compression of the gasket within a coupling assembly as described in connection with the gasket and coupling assembly shown in FIG. 5.

Figure 8:
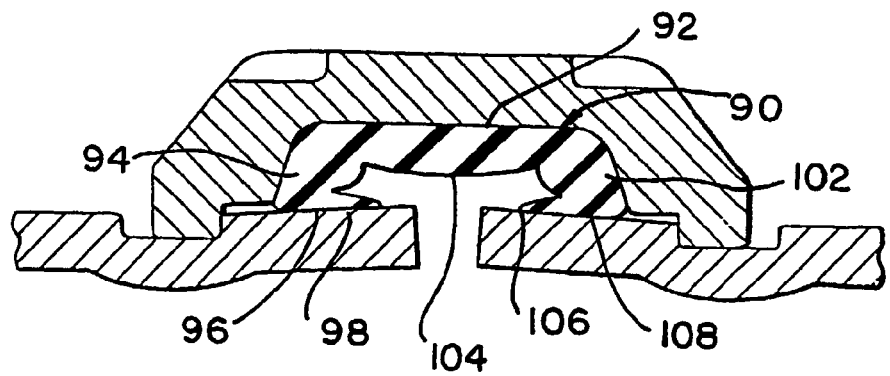
FIG. 8 is a cross-sectional view of a pipe coupling incorporating the gasket of FIG. 7, shown in a compressed condition with the peripheral lubricant retaining groove in a substantially flattened condition, and showing portions of the pipe coupling.

Referring now to FIG. 8, a portion of the gasket 90 of FIG. 7 is shown in a coupling assembly in the compressed configuration, with portions of the coupling assembly components shown for illustrative purposes. Elastomeric ring-like base member gasket 71 has generally radially inwardly extending flange members 94, 102 formed monolithically therewith, with axially inwardly extending lips 98, 106 as shown partially in FIG. 7. Lubricating oil trapping grooves 97, 108 are substantially flattened when the gasket is fully compressed as shown, with the support walls of flange members 94, 102 and inner backwall 104 shown bulging inwardly, yet avoiding fusion and/or contact with relatively shorter lips 98, 106 as shown.

Figure 9:
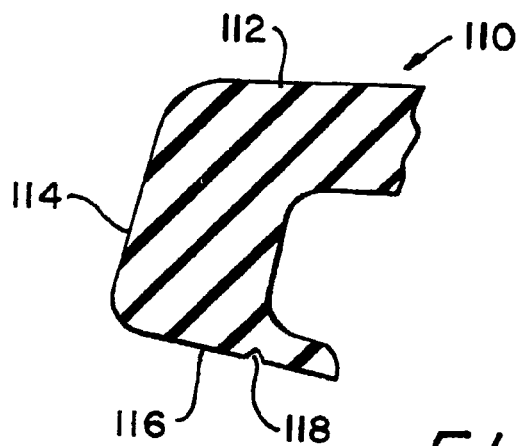
FIG. 9 is a cross-sectional view of a portion of an alternative embodiment of a gasket of the invention, incorporating an alternative embodiment of the peripheral lubricant retaining groove on the sealing surfaces in the form of an inverted "V" shaped notch.

Referring to FIG. 9, there is shown a portion of still another alternative embodiment of the gasket of the present invention, shown at 110, wherein an elastomeric ring-like member 112 is configured as in the previous embodiments, but includes a pair of flange members (only flange member 114 is shown) and sealing surfaces (only surface 116 is shown). A peripheral groove 118 is in the form of an inverted "V" shaped notch 90 which traps lubricating fluid and gradually releases it to the surrounding surface areas upon compression within a coupling assembly. The inverted "V" shaped notch 90 is provided to retain lubricating oil in a manner similar to the inverted "U" shaped grooves in the previous embodiments; however; the "V" shaped notch 90 assumes a flattened configuration upon compression in a more uniform and gradual manner, and ultimately assumes an almost completely flattened shape when the gasket is subjected to compressive forces within a peripheral coupling. In addition, the gradual flattening procedure and the relatively slow release of lubricant to the surrounding areas helps to distribute the lubricating oil more evenly in those areas adjacent the notch, thus assisting in perfecting the seal between the gasket and the pipe ends.

Figure 10:
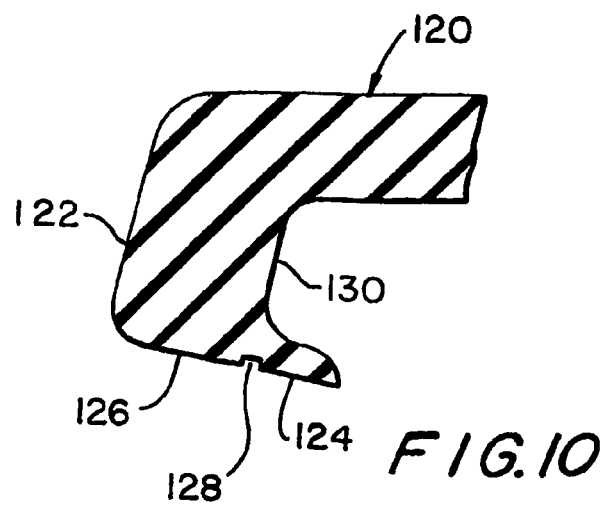
FIG. 10 is a cross-sectional view of a portion of an alternative embodiment of the gasket of the present invention, incorporating another alternative feature in the form of a peripheral inverted "U" shaped groove on the same sealing surface, the groove intended to retain lubricant to lubricate the sealing the components of surfaces of the gasket when it is assembled with a coupling.

Referring now to FIG. 10, there is shown still another alternative embodiment of the present invention wherein a gasket 120 is provided with radially inwardly extended flanges (only flange 122 is shown) and inwardly extending lips (only lip 124 is shown) which extend axially inwardly from the flanges and which form a continuation of a sealing surface 126 which extends along the radially inward end of flange 122. The gasket 120 includes sealing lips (only 124 shown) which are configured similarly to the sealing lips shown in FIG. 8, with the addition of the provision of an inverted rectangular shaped peripheral groove 128 located directly beneath inner flange wall 130. Inverted rectangular shaped groove 128 retains lubricating oil in a manner similar to the previous grooved embodiments and gradually releases the lubricating oil to the surrounding areas as the compression process takes place within a coupling assembly similar to the manner previously described in connection with the previous embodiments. By gradually releasing the lubricating oil to the surrounding areas according to the changing configurations of the groove 128, the inverted rectangular shaped groove assists in completing the seal between sealing surface 126 and the pipe end.

Alternatively, other types of systematic surface irregularities, including grooves and notches, may be used to retain lubricating oil and release it on a systematic and gradual basis during tightening of the coupling so as to assist in compensating for the surface imperfections on the pipe ends. For example, the inverted rectangular shaped groove 128 may alternatively be square in cross-section, or any other shape.

Figure 11:
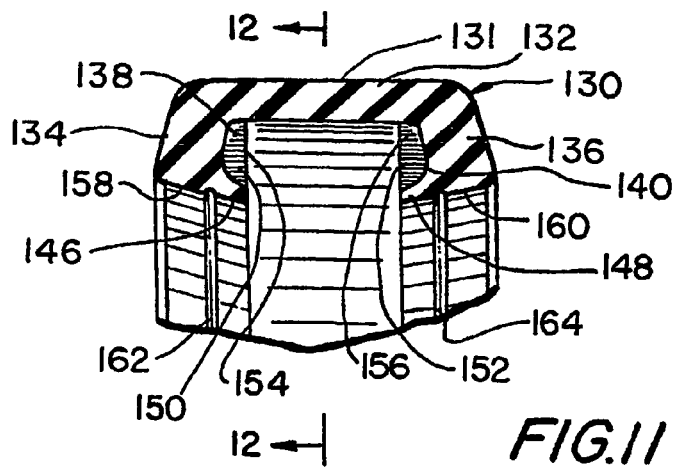
FIG. 11 is a cross-sectional view of a portion of an alternative embodiment of the gasket of the present invention, wherein the peripheral sealing flange and lip are supported by an inner wall constructed of alternating sections of solid elastomeric material separated from each other by alternating spaces as shown in further detail in FIG. 12.

Referring now to FIG. 11 there is shown still yet another embodiment in the form of gasket 130 having peripheral ring-like base member 132. In the embodiment of FIG. 11, radially extending flange members 134, 136 include inner support walls 138, 140, comprised of an alternating series of generally trapezoidal shaped solid wall members 144 respectively separated by alternating correspondingly generally trapezoidal shaped spaces 142 to form an entire circular shaped loop or wall, only part of the loop being shown in FIG. 12. As can be seen in the cross-sectional view of FIG. 11 the inner walls 138, 140 complement the radially inwardly extending lips 146, 148 to enhance the application of sealing pressure against the surfaces of the pipe ends. The surfaces 150, 152 in FIG. 11 represent the inner surfaces of the trapezoidal shaped solid wall sections 144, whereas the inner surfaces 154, 156 in FIG. 11 represent the inner wall surfaces of the flange wall corresponding to spaces 142.

Figure 12:
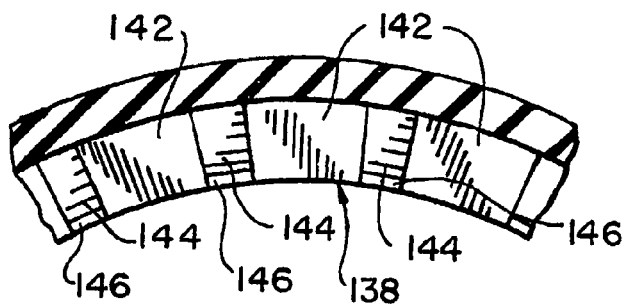
FIG. 12 is a cross-sectional view taken along lines 12-12 of FIG. 11, and illustrating the inner support wall of the sealing flange comprised of a plurality of alternating trapezoidal shaped sections of solid elastomeric material, separated from each other by correspondingly complementary alternating trapezoidal shaped spaces.

Referring again to FIG. 11 in conjunction with FIG. 12, the radially innermost sealing surfaces 158, 160 include generally inverted "U" shaped peripheral grooves 162, 164 which function in a manner similar to the peripheral shaped grooves of the previous embodiment. The peripheral shaped grooves retain lubricating oil when applied to the entire surface of the gasket prior to installing the gasket within the pipe coupling. As the pipe coupling segments are drawn together to a closed position, the grooves 162, 164 gradually become flattened against the pipe surfaces as described in connection with the previous embodiments and gradually release lubricating oil to the surrounding areas to perfect the seal between the sealing surfaces 158, 160 and the respective pipe ends. As the process of tightening the coupling segments progresses, the flange members 134, 136 rotate inwardly until the pipe sealing surfaces 158, 160 become substantially horizontal and engage the outer surfaces of the pipe ends and the inner support wall sections 144 become somewhat compressed and provide radially directed support forces to assist in perfecting the seal between the peripheral outer surface 131 of peripheral base member 132, and the coupling, and between the sealing surfaces 158, 160 of the flange members 134, 136 and the pipe ends. The inner support wall 138 as shown, which as noted, is constructed of alternating sections of generally trapezoidal shaped sections of solid elastomeric material 144, has been found to provide effective structural support forces for the sealing surfaces of the lips 146, 148 with respect to the pipe coupling and the pipe ends. In particular, the alternating sections of the support wall 138 provide supportive forces on the inwardly extending lips 146, 148 in applying sealing pressure against the pipe surfaces.

As described in connection with the previous embodiments, the sealing surfaces 158, 160 can alternatively include other surface irregularities to assist in perfecting the seal such as knurled surfaces, inverted "V" shaped notches, inverted square shaped and rectangular shaped notches, or the like, in order to either retain lubricating oil therein for the assembly process for the coupling and/or to compensate for general imperfections on the pipe surfaces.

Figure 13:
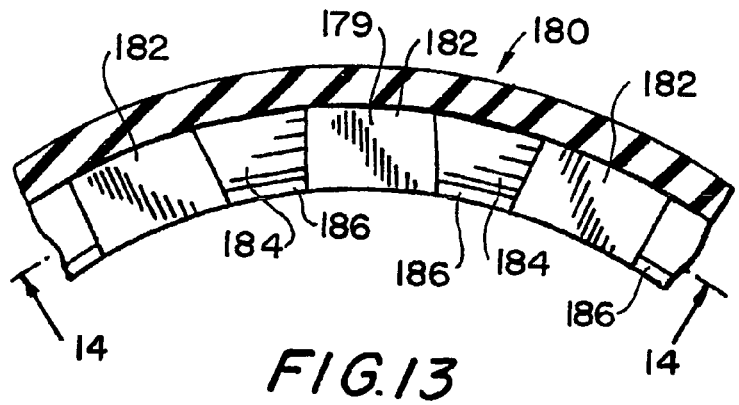
FIG. 13 is a cross-sectional view of an alternative embodiment of the gasket of FIGS. 11 and 12, in which the inner support wall of the sealing flange is comprised of alternating almost rectangular shaped elastomeric sections spaced from each other by generally complementary trapezoidal shaped spaces formed in the support wall.

Referring now to FIG. 13 there is shown still another alternative embodiment of the gasket for couplings as shown in FIGS. 11 and 12 in which gasket 180 includes inner support wall 179 in which the trapezoidal shaped solid elastomeric sections of the inner support wall 138 of FIG. 11 have been replaced by wider generally trapezoidal shaped sections 184 of solid elastomeric material. In this embodiment, the spaces 182 between the generally square shaped solid elastomeric sections 184 are configured as trapezoidal shaped spaces are also wider than spaces 142 in FIGS. 11 and 12 and are arranged in a circular array as shown.

Figure 14:
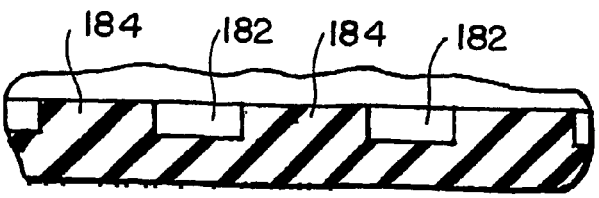
FIG. 14 is a cross-sectional view, taken along lines 14-14 of FIG. 13.

Referring now to FIG. 14 there is shown a cross-sectional view taken along lines 14-14 of FIG. 13, in which the alternating sections of generally trapezoidal shaped sections 184 of solid elastomeric wall material are shown separated by generally trapezoidal shaped spaces or indentations 182. In all other respects the gasket of FIGS. 13 and 14 is identical to the gasket of FIGS. 11 and 12, including the lips 186.

As can be seen from both the gaskets of FIGS. 11-14, the inner wall which is formed of sections of variously shaped sections of solid material separated by spaces of various alternative configurations, the solid material portions become compressed upon assembly of the coupling segments with the gasket seated within the segments of a completed coupling and to provide the requisite forces against the inner surface of the coupling and the outer surface of the pipes, respectively, to effect the seal against leakage of liquid under pressure. By configuring the annular inner wall of the gasket with sections of solid material separated by spaces of various configurations, the solid material sections are permitted to provide the necessary forces for the sealing surfaces of the gasket against the respective coupling and pipe components, while the spaces provide space to permit the solid sections of material to expand without dangerous contact with surfaces which might otherwise cause fusion of components of the gasket when subjected to substantial pressures and temperatures generally encountered in certain applications. Various types of wall configurations may be used, including triangular, circular, oval, and other solid sections separated by correspondingly shaped spaces.

Referring to FIG. 15, there is shown a computer generated graph of the sealing pressure distribution of the sealing surface 49 (shown in FIGS. 1A and 1B) and the pipe surface with prior art gaskets of the type discussed. The pressure is measured from the tip of the lip 48 to the end of the leg. As can be seen, the "sealing" pressure is non-existent over the length of the lip 48; then it ramps up toward the heel (or end) of the leg, and then returns to zero at the end of the leg.

In contrast, FIG. 16 shows a computer generated graph of the sealing pressure for the gaskets of the present invention as shown in FIGS. 1 and 1C, wherein a solid flange is provided with an inner flange wall which is planar and relatively elongated, the lip length "L" is shorter, with the ratio S/A being about 0.30 to about 0.40, and the flange sealing surface includes a lubricant retaining groove 21 located at point "E" in FIG. 16. Although the sealing pressure on the pipe surface drops between points "C" and "D" (which represent the lubricant retaining groove), it has been found that the benefits of the lubricant dispersing effect provided by the groove far outweigh the drop in sealing pressure at the groove, and therefore the optimal presence of a groove does not adversely affect the overall sealing performance of the gasket.

Referring to FIG. 17, there is shown a graph of sealing pressure distribution over the sealing surface of a gasket as shown in FIG. 6, wherein the sealing surface does not include a lubricant retaining groove. In this embodiment the pressure is distributed in a relatively uniform fashion. In this embodiment, a part of the lip provides sealing against the pipe surface due to what is believed to be the transmittal of forces of the flange member 84 and the planar inner flange wall 94 in FIG. 6.

While the invention has been shown and described with respect to preferred embodiments, it will be understood by those skilled in the art that various modifications and changes may be made therein without departing from the spirit and scope of the invention.

What is claimed is:

1. Gasket for use in a mechanical coupling adapted to join adjacent workpieces such as pipe ends, nipples, fittings or combinations thereof, which gasket comprises a generally circular base member formed of an elastomeric material, each peripheral edge portion of said base member having a generally radially inwardly extending flange member formed integrally therewith, each said flange member having an inner annular wall, each said flange member further having a respective axially inwardly facing integral lip having a radially innermost sealing surface, said sealing surface of each said lip being continuous with a radially innermost surface of each said respective flange member to form a radially innermost continuous sealing surface adapted for engagement with an outer surface portion of the workpiece to be coupled, the thickness of each said flange member in an axial direction of the workpiece relative to the length of each lip being such that when the gasket is positioned within a coupling assembly for sealing, and radially directed compressive forces are applied thereto, the radially extending inner annular walls of said flange members assume an inward convex generally conical configuration providing pressure responsiveness and supportive sealing force.

2. Gasket according to claim 1, wherein a peripheral groove is provided on each said radially innermost continuous sealing surface.

3. Gasket according to claim 2, wherein each said peripheral groove is located generally in line with each said inner annular wall of each said flange member.

4. Gasket according to claim 3, wherein said elastomeric material is ethylene polypropylene diene monomer (EPDM).

5. Gasket according to claim 4, wherein each said inner annular wall is generally planar in the uncompressed condition and when positioned within the mechanical coupling and subjected to radially directed compression forces by the coupling, and subjected to internal fluid pressure forces, said inner annular wall generally retains its inward convex generally conical configuration.

6. Gasket according to claim 5, wherein said inward convex generally conical configuration is slightly convex.

7. Gasket according to claim 6, wherein each said peripheral groove is dimensioned and configured to receive a lubricating medium to assist seating of said flange members in face-to-face contact with the respective workpiece.

8. Gasket according to claim 7, each said workpiece is a grooved end pipe and wherein the thickness dimension "S" of each said flange member divided by the dimension "A" from the groove of each pipe to the end of the pipe is between about 0.25 and about 0.45.

9. Gasket according to claim 8, wherein the thickness dimension "S" of each said flange member divided by the dimension "A" from the groove of each pipe to the end of the pipe is between about 0.30 and about 0.40.

10. Gasket according to claim 9, wherein the thickness dimension of each said flange member extends from an outer peripheral wall surface of the respective flange member to each said peripheral lubrication groove.

11. Gasket according to claim 10, wherein said inner annular wall of each said flange member is joined to an inner backwall of said circular base member by an arcuate surface.

12. Gasket according to claim 11, wherein each said flange member forms an angle "α" of between about 60° and about 85° with said generally circular base member when in an uncompressed state.

13. Gasket according to claim 2, wherein each said flange member is structured and adapted such that when incorporated into a mechanical coupling and when mechanical coupling compressive forces and fluid pressure are applied, the sealing pressure distribution between each said flange member and the workpiece increases from an outermost corner of each said flange member to said peripheral groove.

14. Gasket according to claim 13, wherein said sealing pressure distribution between each said flange member and the workpiece drops substantially over the width of said groove and then increases toward said lip.

15. Gasket according to claim 2, wherein each said radially innermost continuous sealing surface includes a plurality of surface irregularities to enhance pressure sealing against the surfaces of the workpiece.

16. Gasket according to claim 15, wherein said surface irregularities comprise a plurality of grooves dimensioned and configured to retain lubricating oil to enhance sealing of each said sealing surface against the respective pipe end.

17. Gasket according to claim 1 wherein each said radially innermost continuous sealing surface includes a plurality of surface irregularities to enhance pressure sealing against the surfaces of the workpiece.

18. Gasket according to claim 17, wherein said surface irregularities comprise a plurality of grooves dimensioned and configured to retain lubricating oil to enhance sealing of each said sealing surface against the respective workpiece.

19. Gasket according to claim 18, wherein said plurality of grooves Comprise knurled grooves or notches.

20. Gasket according to claim 19, wherein said plurality of grooves or notches are arranged in a crisscross pattern.

21. Gasket according to claim 20, wherein each said inner annular wall of each said flange member comprises a plurality of alternating wall members respectively separated by a corresponding plurality of alternating spaces.

22. Gasket according to claim 21, wherein said plurality of alternating wall members each have a generally trapezoidal shape.

23. Gasket according to claim 22, wherein each said plurality of alternating spaces in said inner annular flange wall each have a generally trapezoidal shape.

24. Gasket according to claim 21, wherein each said plurality of alternating wall members are randomly configured.

25. Gasket according to claim 21, wherein each said plurality of alternating spaces are randomly configured.

26. Gasket according to claim 1, wherein each said flange member is structured and adapted such that when incorporated into a mechanical coupling and when mechanical coupling compressive forces and fluid pressure are applied, the sealing pressure distribution increases between each said flange member and the workpiece from an outermost corner of each said flange member to said inner annular wall, and thereafter drops toward each said lip.

27. Gasket for use in a mechanical coupling adapted to join adjacent ends of pipes, nipples, fittings, or combinations thereof, which gasket comprises:
   a) a generally circular base member formed of an elastomeric material and dimensioned and adapted to be positioned within a mechanical coupling assembly in circumferential relation with ends to be coupled, each end defining a generally longitudinal axis;
   b) a pair of axially spaced radially inwardly extending flange members formed integral with said generally circular base member, each said flange member having a predetermined thickness in the axial direction and an annular inner wall surface, each said flange member further having a respective inwardly facing integral lip having a radially innermost sealing surface, said sealing surface of each said lip being continuous with a radially innermost surface of each said respective flange member to form a radially innermost continuous sealing surface adapted for engagement with an outer surface portion of the end to be coupled, the thickness of each said flange member in the axial direction of the end relative to the axial length of the corresponding lip being such that when the gasket is positioned within a coupling assembly to couple two such ends, and radially directed mechanical compression forces are applied thereto by the coupling, said annular inner wall of each said flange member assumes an inward convex generally conical configuration providing pressure responsiveness and supportive sealing force.

28. Mechanical pipe coupling having plural arcuate coupling segments, engagement means on the inner periphery of each said segment for securing the juxtaposed ends of pipe members, a gasket receiving channel in each coupling segment, and means for securing said coupling segments to each other in end-to-end relationship, and a gasket positioned within the gasket receiving channel of said coupling segment, said gasket comprising a generally circular base member formed of an elastomeric sealing material and dimensioned and adapted to be positioned within said channel, said base member having a pair of radially inwardly extending flange members formed integrally therewith, each said flange member having a predetermined thickness in the axial direction and an annular inner wall surface, each said flange member further having an inwardly facing axially extending sealing lip, having a radially innermost sealing surface, said sealing surface of each said sealing lip being continuous with a radially innermost sealing surface of each said respective flange member to form a radially innermost continuous sealing surface therewith for engagement with an arcuate surface portion of each respective pipe end to be coupled, the thickness of each said flange member relative to the axial length of each said corresponding lip being such that when said gasket is subjected to radially directed mechanical compressive forces by said coupling segments, each said annular inner wall of each said flange member assumes an inward convex generally conical configuration so as to apply sufficient sealing force against internal fluid pressure between said coupling segments and the pipe ends.

29. The pipe coupling according to claim 28, wherein each said sealing lip is of thickness in the radial direction sufficient to maintain sealing contact with said pipe ends, said lips being resistant to upward curling forces caused by fluid pressure.

30. Gasket for use in a mechanical coupling adapted to join adjacent grooved end workpieces such as pipe ends, nipples, fittings or combinations thereof, which gasket comprises a generally circular base member formed of an elastomeric material, each peripheral edge portion of said base member having a generally radially inwardly extending flange member formed integrally therewith, each said flange member having an inner annular wall, each said flange member further having a respective axially inwardly facing integral lip having a radially innermost sealing surface, said sealing surface of each said lip being continuous with a radially innermost surface of each said respective flange member to form a radially innermost continuous sealing surface adapted for engagement with an outer surface portion of at least a portion of an end portion of each workpiece to be coupled, the thickness of each said flange member in an axial direction of the workpiece relative to the dimension between the groove and the end of the respective workpiece being between about 0.20 and about 0.50 such that when the gasket is positioned within a coupling assembly for sealing, and radially directed compressive forces are applied thereto, the radially extending inner annular walls of said flange members assume an inward convex generally conical configuration providing pressure responsiveness and supportive sealing force.

31. Gasket for use in a mechanical coupling adapted to join adjacent grooved ends of pipes, nipples, fittings, or combinations thereof, which gasket comprises:

a) a generally circular base member formed of an elastomeric material and dimensioned and adapted to be positioned within a mechanical coupling assembly in circumferential relation with ends to be coupled, each end defining a generally longitudinal axis;

b) a pair of axially spaced radially inwardly extending flange members formed integral with said generally circular ring-like base member, each said flange member having a predetermined thickness in the axial direction and an inner annular wall, each said flange member further having a respective inwardly facing integral lip having a radially innermost sealing surface, said sealing surface of each said lip being continuous with a radially innermost sealing surface of each said respective flange member to form a radially innermost continuous sealing surface adapted for engagement with an outer surface portion of the end to be coupled, the thickness of each said flange member in the axial direction of the end relative to the dimension between the groove and the end of the corresponding end being joined being between about 0.20 and about 0.50 such that when the gasket is positioned within a coupling assembly to couple two such ends, and radially directed mechanical compression forces are applied thereto by the coupling, said inner annular wall of each said flange member assumes an inward convex generally conical configuration providing pressure responsiveness and supportive sealing force.

32. Mechanical pipe coupling having plural arcuate coupling segments, engagement means on the inner periphery of each said segment for securing the juxtaposed ends of grooved end pipe members, a gasket receiving channel in each coupling segment, and means for securing said coupling segments to each other in end-to-end relationship, and a gasket positioned within the gasket receiving channel of the coupling segment, said gasket comprising a generally circular base member formed of an elastomeric sealing material and dimensioned and adapted to be positioned within the channel, said base member having a pair of radially inwardly extending flange members formed integrally therewith, each said flange member having a predetermined thickness in the axial direction and an annular inner wall surface, each said flange member further having an inwardly facing axially extending sealing lip having a radially innermost sealing surface, said sealing surface of each said sealing lip being continuous with a radially innermost sealing surface of each said respective flange member to form a radially innermost continuous sealing surface therewith for engagement with an arcuate surface portion of each respective pipe end to be coupled, the thickness of each said flange member in the axial direction relative to the dimension between the groove and the end of each respective end to be coupled being between about 0.20 and about 0.50 such that when said gasket is subjected to radially directed mechanical compressive forces by said coupling segments, each said annular inner wall of each said flange member assumes an inward convex generally conical configuration so as to apply sufficient sealing force against internal fluid pressure between said coupling segments and pipe ends.

* * * * *